July 17, 1956  W. F. CARLSON  2,754,610
ILLUMINATED FISH LURE
Filed May 25, 1953
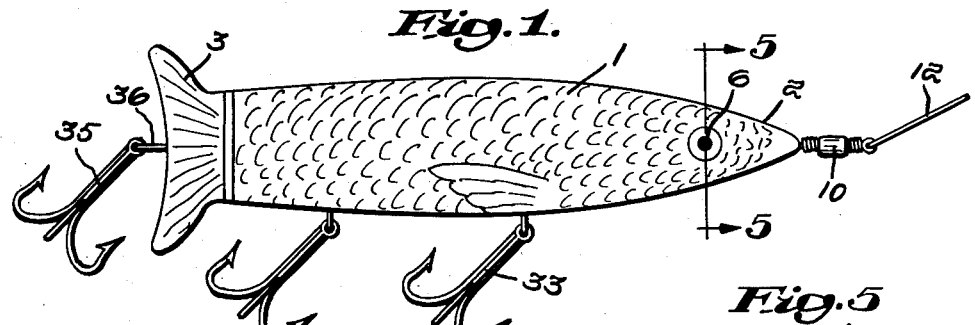
Fig. 1.
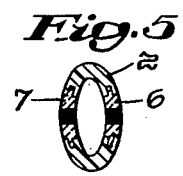
Fig. 5.
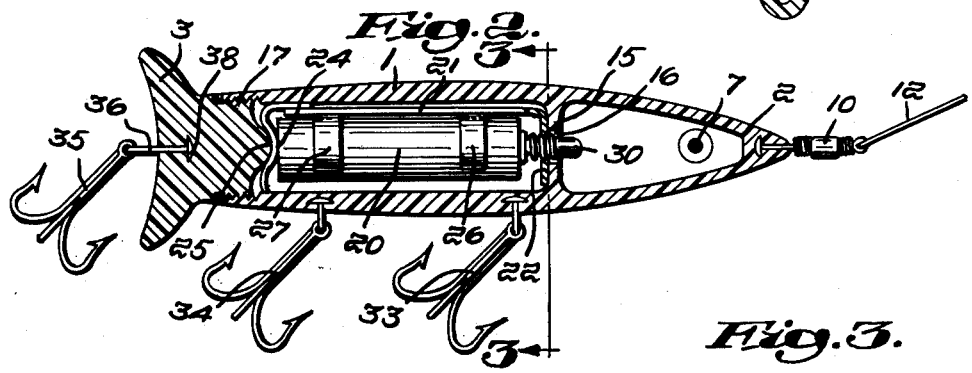
Fig. 2.
Fig. 3.
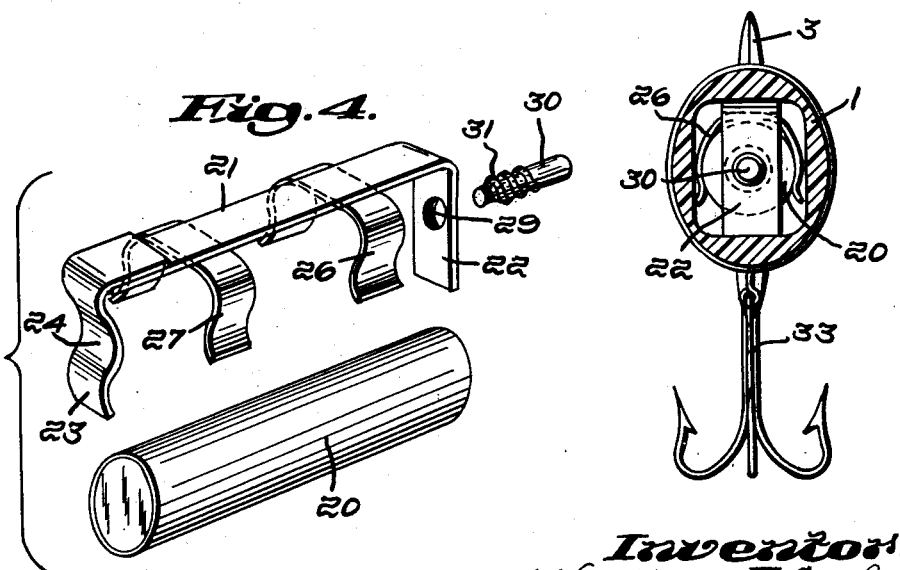
Fig. 4.
Inventor:
William F. Carlson
by James R. Hodder
Attorney

United States Patent Office 2,754,610
Patented July 17, 1956

2,754,610

ILLUMINATED FISH LURE

William Fitts Carlson, Newton Center, Mass.

Application May 25, 1953, Serial No. 356,963

1 Claim. (Cl. 43—17.6)

My present invention is a novel and improved illuminated fish lure, preferably in the form of a minnow or other small fish as a fisherman's bait lure.

Heretofore various efforts have been made to provide a type of fish bait or lure which would have some illuminating feature, such as radiant paint or even a dry cell concealed within the fish body.

My present invention is directed to a novel fish lure substantially in the image of a minnow or the like attractive fish-formed bait with an illuminated body and eye-like portholes to be illuminated to still further attract the fish and to represent a substantially life-like attractive member of the finny tribe.

I have discovered that by utilizing a transparent synthetic plastic for the body portion, and with a small waterproof flashlight battery enclosed within the body and with a light bulb attached thereto and sealed in substantially watertight condition, and also in balanced position so that the weight of the battery and light will cause the fish lure to float evenly, that an extremely attractive and efficient fish lure is obtained, particularly available for night fishing.

While my invention is capable of being made in any suitable size yet it is also capable of manufacture in a relatively small and even tiny representation of a minnow by using minute and efficient flashlight batteries, as well as the corresponding light bulb to fit same, and the floating capacity of a light but strong synthetic plastic transparent material.

In carrying out my invention, I form the body portion as above noted of suitable transparent tough plastic material, such for example as that well known by the name of Plexiglas or equivalent transparent or semi-transparent material, so that a small light bulb at any point will render the entire body luminous throughout its length.

I also provide a readily attachable and detachable spring-clamping member fitted in the interior of the body portion to hold the flashlight in balanced relation so that the center of gravity of the same and clamp will cause the fish lure to float in a manner simulating a real fish and so that it can be drawn through the water slowly or at any speed desired.

I also provide a removable portion, preferably as a tail piece, which can be threaded to the adjacent body portion of the fish lure for removal and replacement of the battery and light.

Preferably, also, I provide a suitable partition against which the battery may be yieldingly secured to hold the same under spring tension when the tail piece is replaced and threaded into position.

Referring to the drawings illustrating a preferred embodiment of my invention:

Fig. 1 is a diagrammatic side elevational view of my novel fish lure;

Fig. 2 is a longitudinal cross-sectional view of the same;

Fig. 3 is a cross-sectional view on the line 3—3 of Fig. 2;

Fig. 4 is a view in perspective of the yielding clamp and flashlight battery; and Fig. 5 is a fragmentary cross-sectional view showing the eye construction on the line 5—5 of Fig. 1.

As shown in the drawings, a hollow body portion 1 of suitable luminous synthetic plastic material is substantially in the form of a minnow, or the like, with a head 2, and removable tail 3. The body portion may also have the exterior finished or embossed to simulate fish scales to still further add to the lure's life-like representation of a fish.

Transparent ports to simulate eyes are fitted in the head part as shown at 6 and 7 on each side through which the illuminating element in the interior will shine more clearly and brightly than the glowing illumination through the body portion. A swivel 10 is fitted in the nose or forepart to which a fish line 12 would be attached to lead to a reel, fishing pole, or the like to be used by the fisherman.

Preferably I form the interior of the body portion with a partition 15 to strengthen the body part and also to constitute a brace to hold the battery more firmly when the tail piece 3 is threaded into union with the correspondingly threaded portion of the rear of the body, as indicated at 17, Fig. 2. The partition 15 is formed with a central opening 16 to permit the lamp which is attached to the battery to project therethrough.

To hold the battery 20 in firm and yielding position, I provide a spring clamp 21 having a depending forepart 22 and a correspondingly depending rear portion 23 with an indented intermediate part 24 against which a corresponding bulge 25 in the tail piece 3 fits. A pair of U-shaped clamps 26 and 27 are also provided, as shown in Fig. 4, the arms of which may be sprung or snapped for receiving the battery 20 to clamp the same in position. The light bulb 30 is formed with a threaded portion 31 which is threaded through a central opening 29 in the forepart 22 to contact with the end of the battery 20, see Fig. 2, whereby the threading of the lamp through the depending part 22 exerts a yielding tension on the battery, which has its opposite end in contact with the inturned indentation 24 of the rear depending spring member 23, see Fig. 4.

With the battery and lamp thus assembled in the clamp 21, the same is slid into the hollow rear portion of the body part with a portion of the lamp 30 projecting through the opening 16 in partition 15 into the hollow head 2 and with the forepart 22 of clamp 21 abutting the rear surface of partition 15 and the tail piece 3 is then threaded into position with the center projection 25 bearing against the indented part 24 of the rear depending portion 23 of the clamp and, thus, a clamping tension between the battery 20 and the lamp 30 is provided to insure firm yielding electrical contact between the battery and the lamp.

A plurality of fish hooks of any form or style can be provided. As shown herein, two gang type fish hooks 33 and 34 are attached to the exterior of the body portion 1 and another gang type fish hook 36 is attached to the rear of the tail piece 3 in any suitable manner. As here shown, each hook is swung or swiveled on a stem 36 which terminates in a head 38 embedded in the adjacent part of the plastic material of the body and of the tail, such fastenings being identical and being illustrated and described as attached to the tail and body portions for illustrative purposes.

It will thus be appreciated that my novel form and construction of illuminated fish lure, by utilizing a semi-transparent synthetic plastic for the body portion, will produce a glowing illumination throughout the length of the fish lure from a single source of light, while the eye ports will flash more brilliantly, the ports being fully transparent and with the weight of the enclosed battery, clamp, and lamp having its center of gravity substantially in alignment with the center of buoyancy of the body portion the lure is held in substantially horizontal submerged and balanced relation whereby, the minnow-like form of the fish lure will float in a life-like manner as it is drawn thru or rests in the water.

I claim:

An illuminated fish lure consisting in a hollow body in the form of a minnow or the like small fish, in combination with a removable battery and fixed lamp, said fish lure comprising a semi-transparent body portion of synthetic plastic material affording a reduced glowing illumination from said lamp, eye-ports of transparent substance for greater light-contrasting effect from said lamp, a transverse partition intermediate the ends of the body portion having an opening therein, a frame within said body portion to hold the removable battery, said frame having its forward portion in contact with said partition and provided with an opening therein, said openings in said partition and the adjacent frame portion being adapted to receive the lamp when attached to the battery to hold said lamp forwardly of said partition to transmit light through the eye-ports, a removable threaded tailpiece to permit the application of and removal from the body portion of said battery and frame, said frame and battery being constructed and arranged within the body portion of said fish lure with the center of gravity thereof in substantial alignment with the center of buoyancy of said body portion and cooperating to hold the hollow body in substantially horizontal submerged and balanced relation, normally maintaining the hollow body in a horizontal position, and a plurality of fish hooks depending from the body portion.

References Cited in the file of this patent

UNITED STATES PATENTS

| | | |
|---|---|---|
| 1,529,459 | Wunderlin | Mar. 10, 1925 |
| 1,617,091 | Wunderlin | Feb. 8, 1927 |
| 1,972,724 | White | Sept. 4, 1934 |
| 2,002,135 | Barton | May 21, 1935 |
| 2,237,534 | Van Der Clute | Apr. 8, 1941 |
| 2,500,442 | Waite | Mar. 14, 1950 |
| 2,528,083 | Ruff | Oct. 31, 1950 |
| 2,550,988 | Flournay | May 1, 1951 |
| 2,598,471 | Waite | May 27, 1952 |